United States Patent Office 3,012,870
Patented Dec. 12, 1961

3,012,870
METHOD OF DESTROYING UNDESIRABLE VEGETATION
Sidney B. Richter, Chicago, Ill., assignor to Velsicol Chemical Corporation, Chicago, Ill., a corporation of Illinois
No Drawing. Filed Aug. 4, 1958, Ser. No. 753,113
9 Claims. (Cl. 71—2.6)

This invention relates to the control of undesirable plant life with chemical compositions and to a process for preparing these chemicals. More specifically, this invention relates to the control of undesirable plant life with compounds of the formula

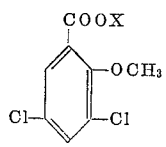

in which X is hydrogen, ammonium, an alkali metal, substituted ammonium, an alkyl radical, or a substituted alkyl radical. Thus, when X is hydrogen, the compound is 2-methoxy-3,5-dichlorobenzoic acid. This chemical compound and its derivatives as cited above have extraordinarily great activity as herbicides useful for the destruction of undesirable plant life.

In accordance with the present invention, it has also been found that 2-methoxy-3,5-dichlorobenzoic acid can be obtained readily in good yield from 3,5-dichlorosalicylic acid. 3,5-dichlorosalicylic acid, which can also be named 2-hydroxy-3,5-dichlorobenzoic acid is obtained by the direct chlorination of salicylic acid.

According to the process of this invention, 2-methoxy-3,5-dichlorobenzoic acid is prepared readily, economically, and in good yield by treatment of 3,5-dichlorosalicylic acid as its alkali metal salt with dimethyl sulfate. The reaction is carried out in aqueous solution, which is prepared by treating each mole of 3,5-dichlorosalicylic acid with at least 2 moles of an alkali metal hydroxide dissolved in water. Alkali metal hydroxides such as sodium or potassium hydroxide are suitable. Although the reaction can be effected satisfactorily with a minimum of 2 moles of alkali metal hydroxide for each mole of hydroxy compound, it is desirable to use an excess of the alkali metal hydroxide. The alkali metal salt of the hydroxybenzoic acid has limited solubility in water, and the use of an excess of up to about 5 moles of alkali metal hydroxide, for example, for each mole of the hydroxybenzoic acid enhances solubility and avoids the use of large volumes of water. A ratio of about 4 mols of alkali metal hydroxide to each mole of 2-hydroxy-3,5-dichlorobenzoic acid is preferred.

The 2-hydroxy-3,5-dichlorobenzoic acid in aqueous solution as its alkali metal salt is treated with a minimum of 1 mole of dimethyl sulfate for each mole of the starting compound. In practice, the use of an excess of dimethyl sulfate is preferred. The compound dimethyl sulfate decomposes slightly in water, which makes somewhat less than the amount initially employed actually available for the reaction. Similarly, some esterification of the carboxylic acid group takes place while the primary reaction of methylation of the hydroxy group is being effected. Thus an excess of dimethyl sulfate is suitably used, equivalent to up to about 5 moles of dimethyl sulfate for each mole of 2-hydroxy-3,5-dichlorobenzoic acid. A ratio of about 4 moles of dimethyl sulfate to each mole of starting compound is preferred.

The dimethyl sulfate is suitably added to the reaction mixture in a constant stream, in portions, or dropwise as is most convenient for the particular apparatus in use. During the addition, it is desirable to maintain the reaction temperature at from about 10° to about 100° C., with external cooling if necessary. Although the process of the invention can be carried out satisfactorily at the upper ranges of reaction temperature indicated, improved yields are obtained by working at the lower temperatures. Reaction temperatures in the range from about 20° to about 50° C. are preferred during the process of adding the dimethyl sulfate. The reaction is satisfactorily carried out at atmospheric pressure, although superatmospheric pressures can be used if desired.

After addition of all the dimethyl sulfate, the reaction mixture is heated at reflux temperature to complete the reaction. The actual time required to complete the reaction depends on a variety of factors, such as the temperature during the addition of dimethyl sulfate, the rate of addition, alkalinity of the solution, and the like. The reaction is ordinarily complete in a few hours. The reaction mixture is then treated with a fresh aqueous solution of alkali metal hydroxide and again refluxed for several hours to hydrolyze any carboxylic acid ester which may have formed as a competing reaction during the formation of the methyl ether. About one-half mole of alkali metal hydroxide is suitably used for each mole of dimethyl sulfate used in the reaction.

The cooled reaction mixture is then acidified to Congo red indicator, and the precipitated acid is filtered off. Although the crude acid so obtained is suitable for many herbicidal uses as such, it can be purified if desired. In a typical purification process, for example, the acid is dissolved in diethyl ether, and the ether solution is dried over a drying agent such as magnesium sulfate before it is filtered and the ether is removed by distillation. The residue is then dried, as in a vacuum oven, to give the crystalline solid 2-methoxy-3,5-dichlorobenzoic acid.

The compounds in which X is ammonium, alkali metal, substituted ammonium, or an alkyl group can be prepared readily from the free acid. Thus X can be made ammonium by treatment of the free acid with ammonium hydroxide, whereupon the product will be ammonium 2-methoxy-3,5-dichlorobenzoate. Similarly, X can be made alkali metal by the treatment of the free acid with bases, such as the hydroxides, of alkali metals. Treatment of the acid with sodium hydroxide thus gives sodium 2-methoxy-3,5-dichlorobenzoate as the product, while the use of potassium hydroxide gives potassium 2-methoxy-3,5-dichlorobenzoate.

Compounds in which X is substituted ammonium are amine salts of 2-methoxy-3,5-dichlorobenzoic acid and are prepared by the addition of the free acid to various amines. Typical amines which can be used to prepare such amine salts are dimethylamine, trimethylamine, triethylamine, diethanolamine, triethanolamine, isopropylamine, morpholine, and the like. The resulting products are, respectively, the dimethylamino, trimethylamino, triethylamino, diethanolamino, triethanolamino, isopropylamino, and morpholino salts of 2-methoxy-3,5-dichlorobenzoic acid.

Compounds in which X is an alkyl group or a substituted alkyl group are esters of 2-methoxy-3,5-dichlorobenzoic acid and are prepared by the condensation of the acid with various alcohols. Thus the condensation of methyl alcohol with 2-methoxy-3,5-dichlorobenzoic acid gives the desired ester, methyl 2-methoxy-3,5-dichlorobenzoate. Other typical alcohols which can be used are propyl, isopropyl, n-butyl, sec-butyl, isobutyl, tert.-butyl, amyl, hexyl, heptyl, octyl, nonyl, decyl, and the like. The products are the corresponding alkyl esters of 2-methoxy-3,5-dichlorobenzoic acid. Although such complex esters as those prepared by the esterification of 2-methoxy-3,5-dichlorobenzoic acid with butoxyethanol, propyleneglycolbutyl ether and the like are useful products in accordance with this invention, preferred esters are those in which X is an unsubstituted alkyl group which contains from 1 to 10 carbon atoms. The condensation of the acid with the alcohol is carried out suitably in an inert solvent such as an aromatic hydrocarbon and in the presence of a few percent by weight of an acid catalyst such as p-toluenesulfonic acid. The water which forms during the esterification reaction can be removed continuously from the reaction mixture by distillation as it forms, and its volume can be measured to determine when the esterification is complete. The ester is then isolated by distillation of the inert solvent.

For practical use in controlling undesirable plant life, the compounds of this invention are formulated and applied in the manner known to the art. For example, these compounds can be formulated into dusts by combining them with such inert substances as talc or clays, and in this form they are dusted directly on the plants it is desired to destroy. The compounds can also be dissolved in organic solvents such as kerosene or the methylated naphthalenes. They can also be emulsified or suspended in water by the addition of emulsifiers or wetting agents. The liquid formulations of these active herbicidal compounds are either applied directly to the plants to be controlled by spraying, or the soil in which the plants are growing can be treated. Other substances such as activators, synergists, spreaders, and adhesives can be added to the formulations if desired.

The specific manner in which the compounds of this invention can be prepared and utilized is illustrated in the following examples:

EXAMPLE I

Preparation of 3,5-dichlorosalicyclic acid

Salicyclic acid (400 g.; 2.9 moles) was slurried with 2500 ml. of glacial acetic acid in a 5-liter, round-bottomed, three-necked flask fitted with a mechanical stirrer and a gas inlet tube. The slurry was chilled by ice-cooling and was stirred vigorously while chlorine gas was passed into the reaction mixture, which was maintained below 35° C. Chlorine was passed into the reaction mixture in this manner until a 10% excess by weight over the theoretically required amount of chlorine had been introduced. The mixture was then stirred at room temperature for one hour and filtered. The white solid product was crystallized from a water-alcohol mixture to give 450 g. (75% of theory) of 3,5-dichlorosalicyclic acid, melting point 216° to 218° C.

EXAMPLE II

Preparation of 2-methoxy-3,5-dichlorobenzoic acid 3,5-dichlorosalicyclic acid (300 g.; 1.45 moles) was dissolved in a solution of sodium hydroxide (232 g.; 5.8 moles) in 1400 ml. of water in a 5-liter, 3-necked, round-bottomed flask fitted with a mechanical stirrer and a water-cooled reflux condenser. The flask was packed in ice, and dimethyl sulfate (366 g.; 2.9 moles) was added with rapid stirring. The mixture was stirred for 20 minutes while the temperature was maintained below 35° C. with good ice cooling. Another portion of dimethyl sulfate (366 g.) was then added, and the mixture was stirred for 10 minutes while the temperature was maintained below 45° C. The mixture was then heated to reflux temperature and refluxed for 2 hours. A solution of sodium hydroxide (116 g.; 2.9 moles) in 400 ml. of water was added, and the mixture was refluxed for an additional 2 hours, after which it was cooled and acidified to Congo red indicator with hydrochloric acid. The precipitate was extracted with diethyl ether, and the ether solution was dried over magnesium sulfate and filtered before the ether was removed by distillation to give 238 g. (74% of theory) of white crystalline 2-methoxy-3,5-dichlorobenzoic acid, melting point 166° to 167.5° C.

Analysis for $C_8H_5O_3Cl_2$: Theory—C, 43.47; H, 2.74; Cl, 32.09. Found—C, 43.55; H, 2.80; Cl, 31.84.

EXAMPLE III

Preparation of 2-methoxy-3,5-dichlorobenzoic acid at an elevated temperature 3,5-dichlorosalicylic acid (207 g.; 1 mole) is dissolved in a solution of potassium hydroxide (112 g.; 2.0 moles) in 1000 ml. of water. The solution is heated to reflux (about 100° C.) and stirred vigorously while dimethyl sulfate (631 g.; 5.0 moles) is added dropwise. The reaction mixture is then treated with a solution of potassium hydroxide (140 g.; 2.5 moles) in 250 ml. of water and refluxed for an additional 2 hours. The cooled reaction mixture is then acidified to Congo red with hydrochloric acid to precipitate the desired 2-methoxy-3,5-dichlorobenzoic acid, which is purified as described in Example II.

EXAMPLE IV

Preparation of 2-methoxy-3,5-dichlorobenzoic acid at a low temperature 3,5-dichlorosalicylic acid (207 g.; 1.0 mole) is dissolved in a solution of sodium hydroxide (200 g.; 5.0 moles) in 2000 ml. of water. The solution is stirred vigorously and cooled to a temperature of 10° C. by means of an ice-salt bath. Dimethyl sulfate (126 g.; 1.0 mole) is then added dropwise to the reaction mixture at such a rate that the temperature rises above 10° C. only momentarily. After all the dimethyl sulfate has been added, the reaction mixture is then allowed to come to room temperature and is heated to reflux, at which temperature it is stirred vigorously for 2 hours. A solution of sodium hydroxide (20 g.; 0.5 mole) in 250 ml. water is added, and the reaction mixture is refluxed an additional 2 hours. 2-methoxy-3,5-dichlorobenzoic acid is then isolated from the cooled reaction mixture as described in Example II.

EXAMPLE V

Preparation of sodium 2-methoxy-3,5-dichlorobenzoate 2-methoxy-3,5-dichlorobenzoic acid (116 g.; 0.5 mole) is dissolved in 500 cc. of methanol and treated with a solution of sodium hydroxide (20 g.; 0.5 mole) in 100 cc. of methanol. The methanol is removed by distillation in vacuo on the steam bath, and the solid residue is slurried with 100 cc. of cold dry ether, filtered, pressed dry, and dried completely in a vacuum oven to give the desired salt, sodium 2-methoxy-3,5-dichlorobenzoate.

EXAMPLE VI

Preparation of ammonium 2-methoxy-3,5-dichlorobenzoate

Treatment of 2-methoxy-3,5-dichlorobenzoate acid (116 g.; 0.5 mole) in 500 cc. of methanol with 34 cc. of commercial concentrated ammonium hydroxide according to the method given in Example V gives the desired salt, ammonium 2-methoxy-3,5-dichlorobenzoate.

EXAMPLE VII

Preparation of the dimethylamine salt of 2-methoxy-3,5-dichlorobenzoic acid 2-methoxy-3,5-dichlorobenzoic acid (116 g.; 0.5 mole) is dissolved in 500 cc. of dry ether and treated with dimethylamine (22.5 g.; 0.5 mole). The solid which separates is filtered, washed twice with 100 cc. portions of cold ether, filtered, pressed dry, and dried completely in a vacuum oven to give the desired dimethylamine salt of 2-methoxy-3,5-dichlorobenzoic acid.

EXAMPLE VIII

*Preparation of the diethanolamine salt of 2-methoxy-3,5-dichlorobenzoic acid*

In the manner described in Example VII, 2-methoxy-3,5-dichlorobenzoic acid (116 g.; 0.5 mole) is treated with diethanolamine (52.5 g.; 0.5 mole) in 500 cc. of dry ether. The product which is isolated is the diethanolamine salt of 2-methoxy-3,5-dichlorobenzoic acid.

EXAMPLE IX

*Preparation of the morpholine salt of 2-methoxy-3,5-dichlorobenzoic acid*

2-methoxy-3,5-dichlorobenzoic acid (116 g.; 0.5 mole) is treated with morpholine (43.5 g.; 0.5 mole) in 500 cc. of ether, and the product is worked up as described in Example VII to give the desired morpholine salt of 2-methoxy-3,5-dichlorobenzoic acid.

EXAMPLE X

*Preparation of methyl 2-methoxy-3,5-dichlorobenzoate*

2-methoxy-3,5-dichlorobenzoic acid (116 g.; 0.5 mole), methyl alcohol (16 g.; 0.5 mole), and 3.0 g. of p-toluenesulfonic acid are dissolved in 500 ml. of benzene, and the solution is placed in a 1 liter, round-bottomed flask fitted with a reflux condenser and a calibrated Dean-Stark tube. The solution is heated at reflux temperature until 9 cc. of water have been collected in the Dean-Stark tube. The cooled reaction mixture is then extracted twice with 50 cc. portions of 10% sodium carbonate solution, washed once with water, dried over anhydrous sodium sulfate, and filtered. The benzene is then distilled off in vacuo on the steam bath, and the residue is distilled in vacuo to give the desired ester, methyl 2-methoxy-3,5-dichlorobenzoate.

EXAMPLE XI

*Preparation of decyl 2-methoxy-3,5-dichlorobenzoate*

In the manner and apparatus described in Example X, 2-methoxy-3,5-dichlorobenzoic acid (116 g.; 0.5 mole) and normal primary decyl alcohol (79 g.; 0.5 mole) are refluxed in 500 ml. of benzene in the presence of 3.0 g. of p-toluenesulfonic acid until 9 cc. of water have been distilled from the reaction mixture. Work-up of the reaction mixture as described in Example X gives the desired ester, decyl 2-methoxy-3,5-dichlorobenzoate.

EXAMPLE XII

*Preparation of iso-butyl 2-methoxy-3,5-dichlorobenzoate*

The reaction of 2-methoxy-3,5-dichlorobenzoic acid (116 g.; 0.5 mole) and iso-butyl alcohol (37 g.; 0.5 mole) by the method described in Example X is used to prepare the ester, iso-butyl 2-methoxy-3,5-dichlorobenzoate.

EXAMPLE XIII

*Preparation of an emulsifiable concentrate of 2-methoxy-3,5-dichlorobenzoic acid*

The following concentrate is prepared by mixing the ingredients intimately in the given percentage proportions by weight:

| | Percent |
|---|---|
| 2-methoxy-3,5-dichlorobenzoic acid | 25 |
| Antarox A-400 | 40 |
| Methanol | 35 |

"Antarox A-400" is the trade name under which a nonionic detergent of the aromatic polyethylene glycol ether type is sold. The above concentrate is diluted with water to the desired concentration for use.

EXAMPLE XIV

*Preparation of an emulsifiable concentrate of iso-butyl 2-methoxy-3,5-dichlorobenzoate*

The following ingredients are mixed thoroughly in the given percentage proportions by weight:

| | Percent |
|---|---|
| Iso-butyl 2-methoxy-3,5-dichlorobenzoate | 59 |
| Triton X-100 | 5 |
| Xylene | 10 |
| Kerosene | 26 |

"Triton X-100" is the trade name under which an emulsifier of the alkyl aryl polyether alcohol type is sold. The above concentrate is diluted with water to the desired concentration for use.

EXAMPLE XV

*Preparation of a dust from sodium 2-methoxy-3,5-dichlorobenzoate*

The following dry ingredients are ground together in the given percentage proportions by weight in a mechanical mixer until a homogeneous mixture is obtained:

| | Percent |
|---|---|
| Sodium 2-methoxy-3,5-dichlorobenzoate | 25 |
| Talc | 75 |

The resulting dust is suitable for hand or machine dusting on plants.

The herbicidal activity of chemical compounds is often demonstrated by the ability of the chemicals to kill or arrest the growth of tomato plants. The tomato plant is readily grown and maintained under uniform conditions for experimental purposes in greenhouses, and its response to chemicals is very similar to that observed for a wide variety of economically important species of undesirable plant life in the field.

The herbicidal activity of the compounds of this invention, for example, can be illustrated in greenhouse experiments on young potted tomato plants (Bonny Best variety). The compounds are formulated into 10 percent wettable powders and are dispersed in water at a concentration of 2000 parts per million actual chemical. Ten milliliters of an aliquot portion of the dispersion is added to the soil surface of the tomato plants, approximately 5 to 7 inches tall. In order to avoid undue concentration or accumulation of the chemical in any given area, 5 holes the size of a pencil and about 1 inch deep are punched in the soil surface around the shoot, and the 10 milliliter application is divided equally among the 5 holes. Three plants are used for each application. The treated plants are held under greenhouse conditions for 7 days, provided with subterranean watering, and observed for response to treatment. The results indicate a high order of herbicidal toxicity of the compounds of this invention compared to the untreated controls.

I claim as my invention:

1. A method of destroying undesirable plants which comprises contacting said plants with a herbicidal composition comprising an inert carrier and as the essential active ingredient, in a quantity which is injurious to said plants, a compound selected from the group consisting of 2-methoxy-3,5-dichlorobenzoic acid, its esters in which the esterifying group is an unsubstituted alkyl group containing from one to ten carbon atoms, its alkali metal salts, and its amine salts in which the amine component contains up to ten carbon atoms.

2. A method as described in claim 1, wherein the compound is an alkali metal salt of 2-methoxy-3,5-dichlorobenzoic acid.

3. A method as described in claim 1, wherein the compound is an amine salt of 2-methoxy-3,5-dichlorobenzoic acid in which the amine component contains up to ten carbon atoms.

4. A method as described in claim 1, wherein the compound is an ester of 2-methoxy-3,5-dichlorobenzoic acid in which the esterifying group is an unsubstituted alkyl group containing from one to ten carbon atoms.

5. A method as described in claim 1, wherein the compound is 2-methoxy-3,5-dichlorobenzoic acid.

6. A method as described in claim 1, wherein the compound is sodium 2-methoxy-3,5-dichlorobenzoate.

7. A method as described in claim 1, wherein the compound is the diethanolamine salt of 2-methoxy-3,5-dichlorobenzoic acid.

8. A method as described in claim 1, wherein the compound is n-butyl 2-methoxy-3,5-dichlorobenzoate.

9. A method as described in claim 1, wherein the compound is iso-propyl 2-methoxy-3,5-dichlorobenzoate.

References Cited in the file of this patent

UNITED STATES PATENTS

| | | |
|---|---|---|
| 2,394,916 | Jones | Feb. 12, 1946 |
| 2,724,643 | Morris et al. | Nov. 22, 1955 |
| 2,726,947 | Baumgartner | Dec. 13, 1955 |
| 2,847,462 | Sieger | Aug. 12, 1958 |
| 2,848,470 | Girard et al. | Aug. 19, 1958 |

OTHER REFERENCES

Hirwe et al. in "Prac. Indian Acad. Sci.," vol. 8A, pp. 208–213.

Weintraub et al. in "Botanical Gazette," vol. 113, March 1952, pages 348 to 362.

Miur et al. in "Chemical Abstracts," vol. 47, 1953, col. 9435g.

Zincke in "Chemical Abstracts," vol. 6, 1912, page 1753.

Shirley et al. in "Jr. Org. Chem.," vol. 22, No. 5, May 1957, p. 496.

Wagner and Zook: "Synthetic Organic Chemistry," publ. by J. Wiley and Sons, N.Y., 1953, pp. 228–9.

UNITED STATES PATENT OFFICE
CERTIFICATE OF CORRECTION

Patent No. 3,012,870                          December 12, 1961

Sidney B. Richter

It is hereby certified that error appears in the above numbered patent requiring correction and that the said Letters Patent should read as corrected below.

Column 4, line 12, for "$C_8H_5O_3Cl_2$" read -- $C_8H_6O_3Cl_2$ --; same column 4, line 65, for "dichlorobenzoate" read -- dichlorobenzoic --.

Signed and sealed this 19th day of June 1962.

(SEAL)
Attest:

ERNEST W. SWIDER                                DAVID L. LADD
Attesting Officer                                     Commissioner of Patents